Figure 4:
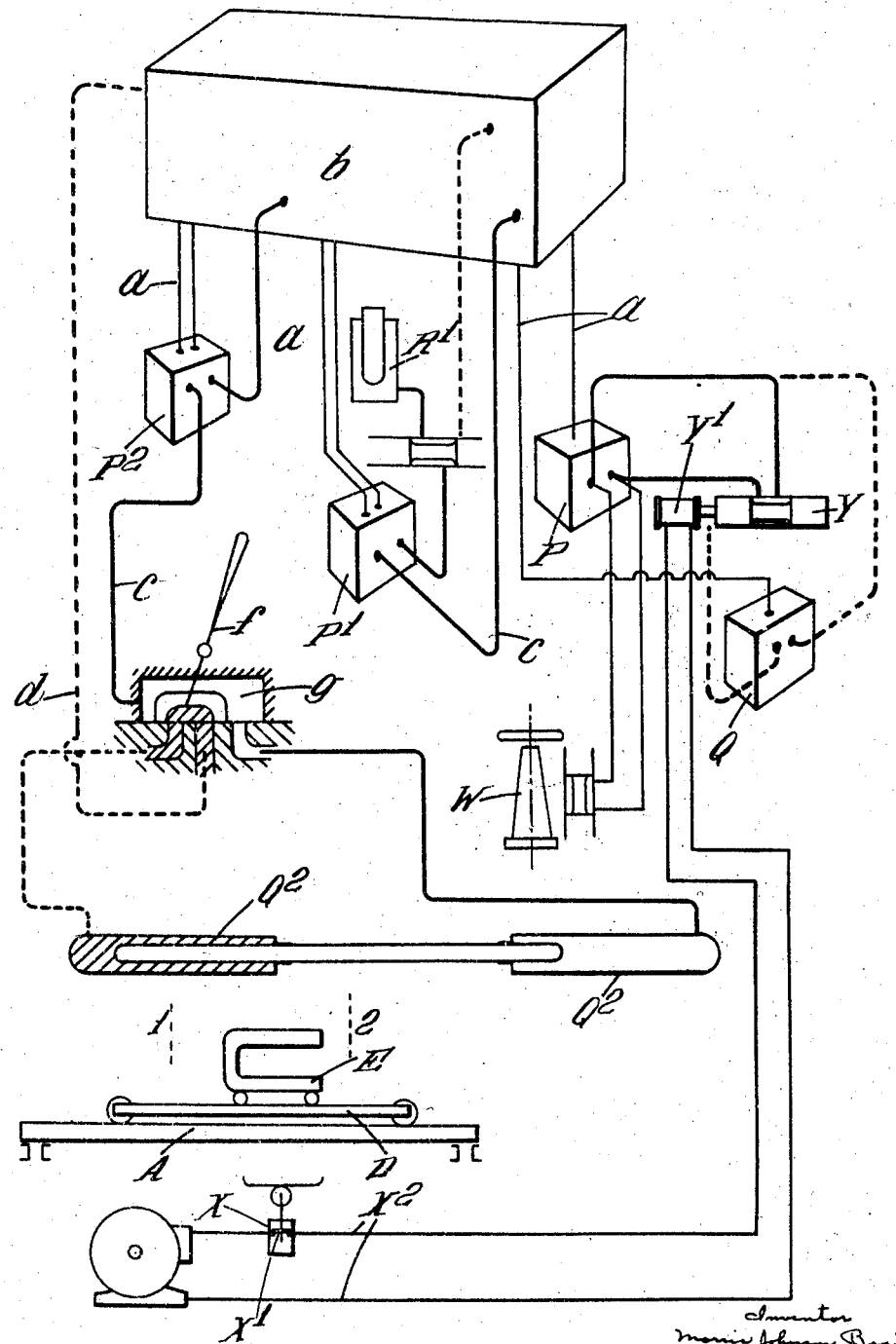

July 20, 1943. M. J. BRATLEY 2,324,817
TRAVERSER
Filed Sept. 29, 1942 6 Sheets-Sheet 1
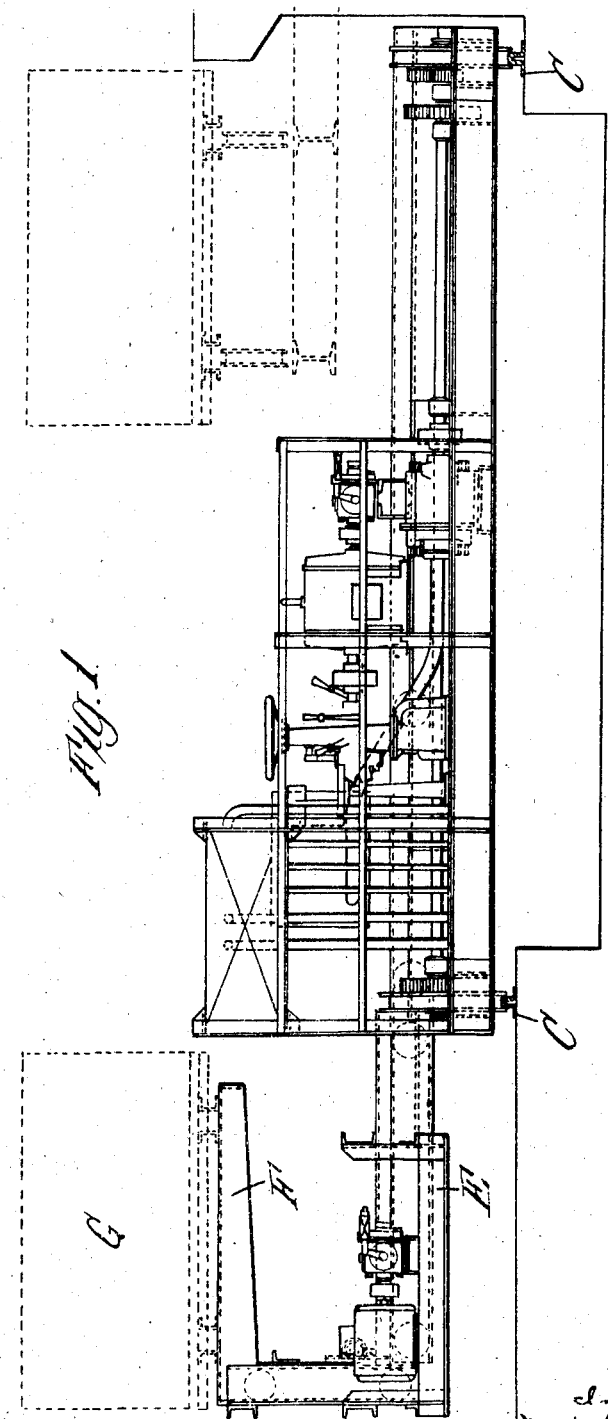

July 20, 1943.  M. J. BRATLEY  2,324,817
TRAVERSER
Filed Sept. 29, 1942   6 Sheets-Sheet 2
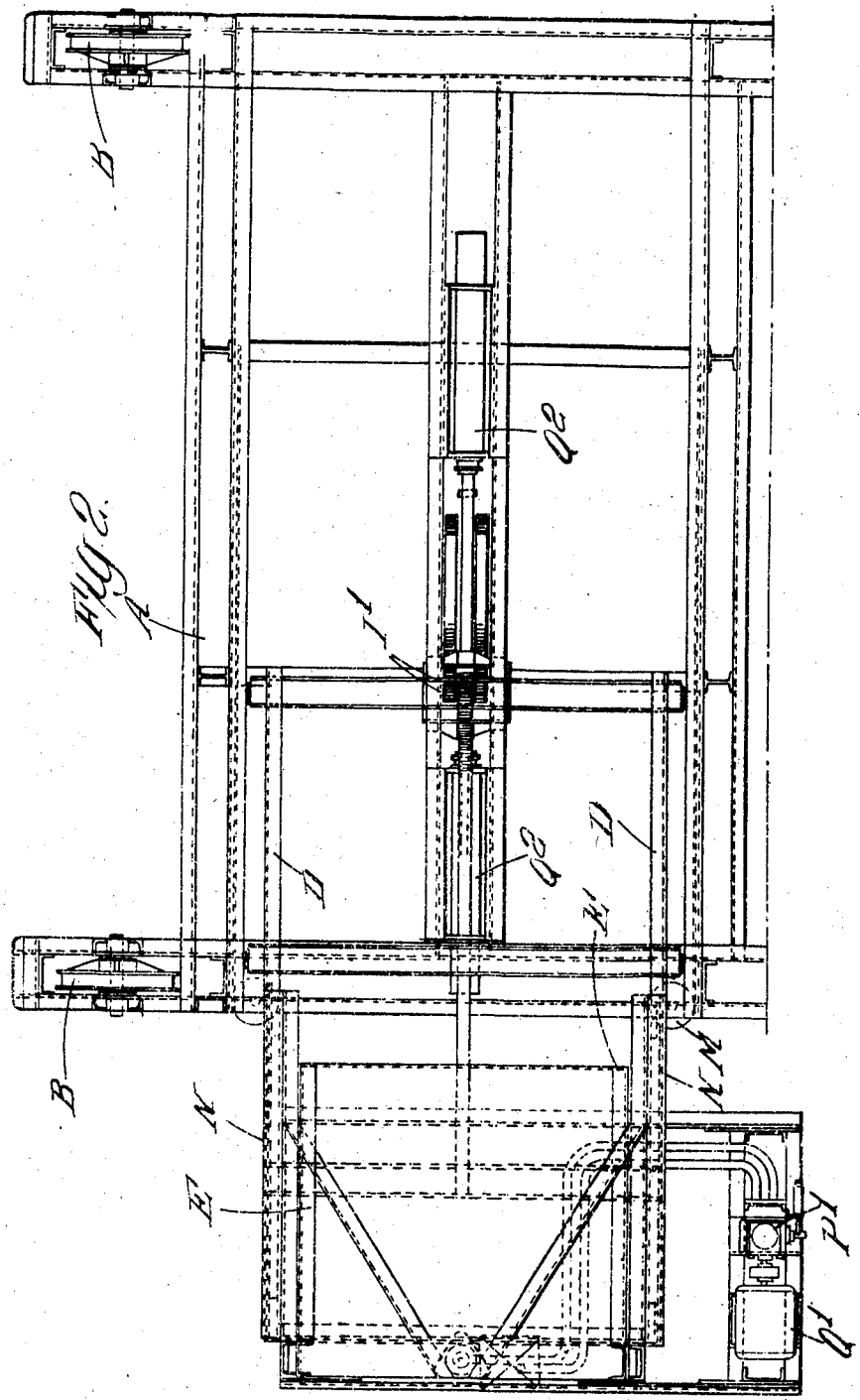

July 20, 1943.  M. J. BRATLEY  2,324,817
TRAVERSER
Filed Sept. 29, 1942   6 Sheets-Sheet 3
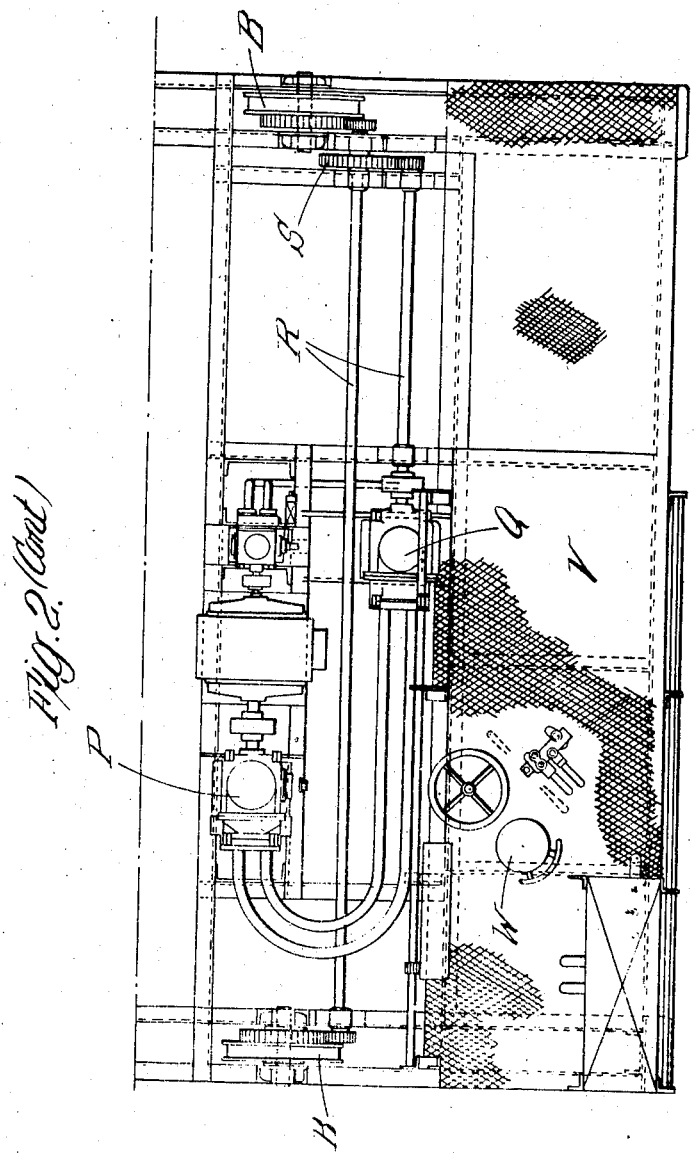

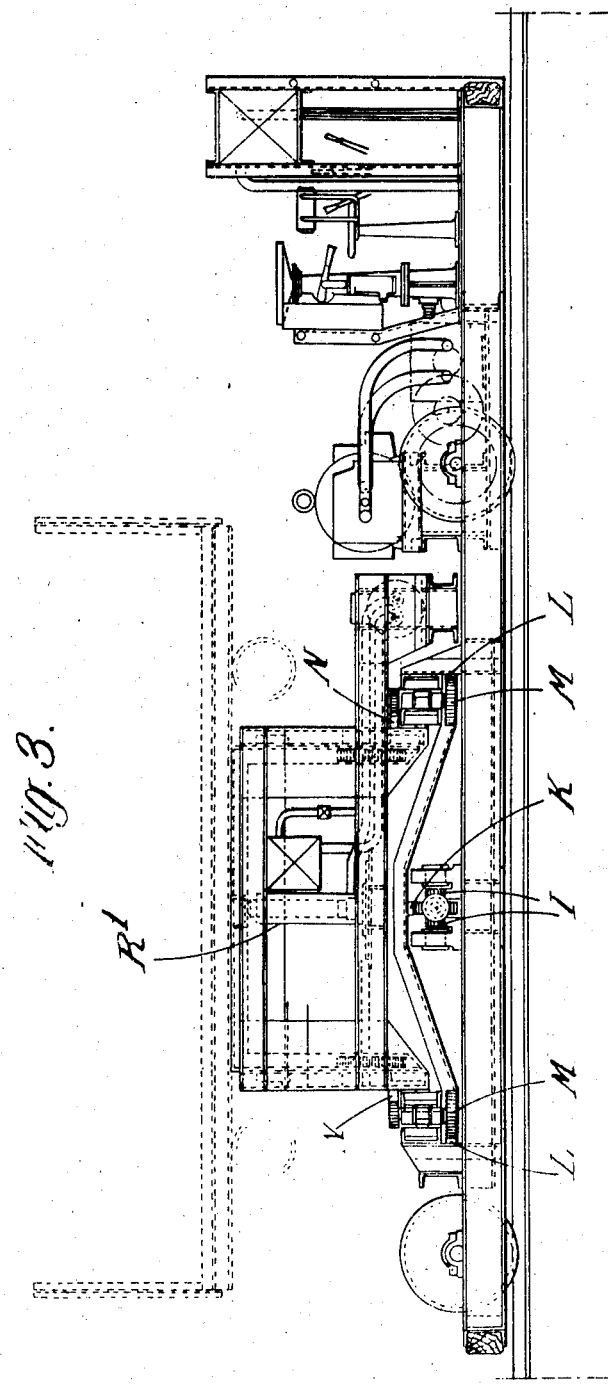

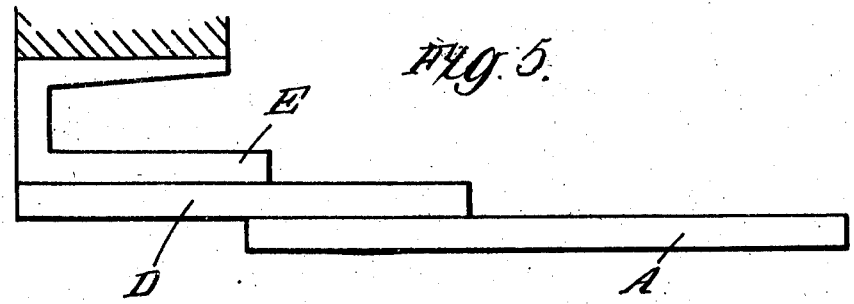
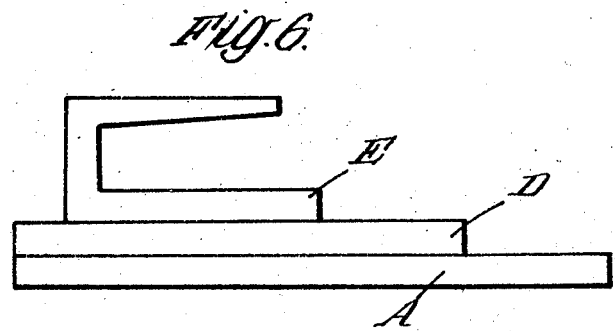
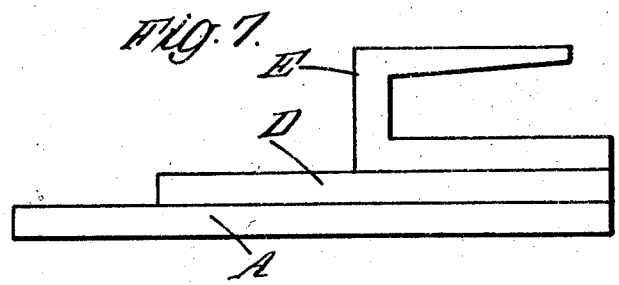

Patented July 20, 1943

2,324,817

UNITED STATES PATENT OFFICE 2,324,817

TRAVERSER

Morriss Johnson Bratley, West Bridgford, England, assignor to Herbert Morris Limited, Loughborough, England, a company of Great Britain and Northern Ireland Application September 29, 1942, Serial No. 460,129
In Great Britain July 12, 1941

5 Claims. (Cl. 212—74)

This invention relates to a machine for use in handling and sorting trucks or containers in warehouses or at railway termini and marshalling yards. The invention has for its object to provide an arrangement of self-contained elevator and traverser mounted for movement along a track at right angles to the direction of traverse, by which trucks or containers may be transferred to and from a storage or spares line positioned at one side of the traverser, and traversed and deposited at a desired point on a loading or unloading track parallel with the storage or spares line at the other side of the traverser, or by which loads can be transferred from one position to another position on the same loading or spares line.

The traverser in accordance with the invention includes a carriage movable along the track and an extensible sub-carriage movable transversely of the main carriage, the said sub-carriage forming a track for a further carriage provided with elevating arms engageable beneath a truck and adapted to elevate and carry it across the traverser carriage from one side to the other, means being provided to prevent transverse movement of the sub-carriage and the elevating arms carriage from its substantially central position while the main carriage of the traverser is in motion and to prevent the main carriage from being moved when the elevating arms carriage is in any other than its central position.

A power unit is provided to raise the elevating arm to lift or lower the truck off or on to the loading or spares line while a separate power unit is preferably provided for moving the traverser along the track provided therefor and for effecting the extending movement of the sub-carriage, such power units being interlocked.

The carriage supporting the elevating arms and the sub-carriage in combination with the main carriage form a telescopic unit, the elements of which are moved through compound racks and pinions from the means for actuating the sub-carriage in such manner that in a movement of the sub-carriage of relatively small extent the elevating arms may be moved from beyond the main carriage at one side of the traverser to a position say where the sub-carriage and elevating arm carriage are flush with the end of the traverser or main carriage when the limit of movement in the opposite direction is reached.

In a preferred embodiment the traverser is driven by hydro-electric means including a series of motor driven pumps controlling the carriage, the elevating arms and the traversing movement of the sub-carriage, a switch being included in circuit with the driving motor in such manner that the switch is closed when the elevating arms are between fixed positions but which is opened and kept open when the truck carried by the elevating arm reaches or extends beyond the fixed positions so that the traverser cannot be moved forwards or backwards with the truck and elevating arms projecting beyond the fixed positions. Normally in this condition the supply of driving fluid to the pump operating the traverser is interrupted by the opening of a by-pass which is closed when the circuit is closed to allow traversing movement.

A preferred embodiment of the invention is illustrated in the accompanying drawings, in which Fig. 1 is a side elevation of the self-contained elevator and traverser mounted on its track showing in dotted lines a wagon on the storage or spares line where it is assumed to be supported between spaced pillars and showing at the other side also in dotted lines a wagon on the loading or unloading line, the sub-carriage and the carriage supporting the elevating arms of the traverser being in their fully extended position to one side of the track beneath the wagon on the spares line. Fig. 2 is a plan view of the elevator and traverser illustrating also hydro-electric operating means and Fig. 3 an end view, and Fig. 4 illustrates diagrammatically the hydro-electric operating means and means for ensuring that the traverser cannot be moved back and forwards when the elevating arms project beyond the central position and permitting the traverser to be moved when the elevating arms lie within the central position. Figs. 5, 6 and 7 are diagrammatic views showing successive positions occupied by the carriage supporting the elevating arms and by the sub-carriage or the traverser in their telescoping movement.

As shown, the traverser includes a main carriage indicated generally by A fitted with wheels B and movable along the track C and an extensible sub-carriage D movable transversely of the main carriage A, the said sub-carriage D forming a track for a further carriage E adapted to be extended beyond the sub carriage D and fitted with elevating arms F engageable beneath a truck G and adapted in conjunction with the sub-carriage D to carry it across the traverser carriage A from one side to the other, and deposit it at a suitable point on such other side of the traverser to which the main carriage may have been moved along its track C, means to be later described preventing the traverser from being moved along its track until the sub-carriage and the elevating arms have been brought within the width bounded by the parallel spares and loading lines and permitting the main carriage to be moved only when the sub-carriage and elevating arms are in this position.

The carriage E supporting the elevating arms F and the sub-carriage D form with the main carriage a telescopic unit the elements of which are moved transversely of the main carriage in unison by means of hydraulic rams and in order that the carriage supporting the elevating arm will move through the considerable distance between the spares line and the loading and unloading track while the sub-carriage D and the rams move through a relatively short distance, the sub-carriage D and the carriage E supporting the elevating arms are connected by a system of compound racks and pinions comprising stationary racks I on the main carriage engaged by pinions I' moved over such racks by the rams and thus transmitting motion to moving racks K mounted on the sub-carriage D which in turn transmits motion through stationary racks L mounted thereon through pinions M to moving racks N mounted on the truck supporting carriage E. In this way in a movement of the rams of say three feet the sub-carriage D is moved through twelve feet and the carriage E through a distance of eighteen feet, i. e. the carriage is moved from the position shown in Fig. 5 through the position shown in Fig. 6 to the position shown in Fig. 7 while the sub-carriage D is moved through a much shorter distance.

The traverser mechanism is operated by hydro-electric means including a series of motor driven pumps, the pump P through a hydraulic motor Q rotating shafts R and pinions S driving the wheels B and effecting the traversing movement of the main carriage A, the pump P' driven by the electric motor Q' and operating the ram R' controlling the elevating arms F and the hydraulic pump $P^2$ controlling through the hydraulic rams $Q^2$ and the compound rack and pinion mechanism above described the transverse movement of the sub-carriage D and of the carriage E.

The various pumps and their connections are illustrated diagrammatically in Fig. 4 which also indicates the main carriage A, the sub carriage D and carriage E and the means for controlling the movement of the main carriage. To ensure that the space within the various control units not occupied by components is filled with oil and that no air pockets exist these connections $a$ are made between the units and the tank $b$ which thus functions as an exhaust box and compensates for any change in the volume of the fluid. The full lines $c$ indicate the suction to and the delivery from the pumps and the dotted lines $d$ indicate the exhaust to the tank, except in the case of the main traverse hydraulic motor Q where the dotted lines indicate the path of the fluid when the by-pass valve Y is closed. It will be observed that movement of the lever $f$ operates the valve $g$ to cause the sub-carriage and the carriage for the elevating arms to be moved in either direction. X denotes a switch, the switch plunger X' of which is depressed to close the circuit $X^2$ when the elevating arms F are between fixed positions 1 and 2 but is opened when a truck carried by the elevating arms is beyond these fixed positions so that the main carriage cannot be moved back and forwards with the truck and elevating arms projecting. The closure of the switch X energizes a solenoid Y' which closes a valve Y which acts when open to by-pass the pump delivery and prevent the hydraulic motor from operating so that the main carriage cannot be moved back and forwards.

The whole of the mechanism can be controlled by a single operator in a seat U on a platform V on the main carriage within reach of the various control levers or switches. The platform V may be disposed at the same level as the loading track. Alternatively dual control may be fitted so that the operator can drive the machine from either the front or the rear, whichever gives him an unobstructed view when travelling. A lever mechanically coupled to the wheel controlling the operation of the main travel motion is arranged to contact with and be actuated by ramps positioned at each end of the traverser rail track so as to automatically return the control wheel to the neutral or "stop" position as the traverser approaches the terminals. Thus, should the operator, for some reason or other, fail to stop the machine at the end of its travel, the combination of ramp, lever and linkage will automatically correct the omission.

I claim:

1. Elevating and traversing apparatus for handling and sorting loads by traversing them from a storage line at one side of a traverser to a line parallel with this storage line on the other side of the traverser and for transferring loads from one position to another position on the same line, in which the traverser includes a main carriage movable along a track parallel with the said lines, an extensible sub-carriage movable transversely of the main carriage and a load supporting carriage for supporting the load to be transferred, said load supporting carriage engageable beneath the load and including elevating arms for raising the load and said load supporting carriage movable with and operatively interconnected with the sub-carriage to effect the transfer and means for preventing traversing movement of the main carriage when the sub-carriage and the load supporting carriage are extended beyond fixed substantially central positions.

2. Elevating and traversing apparatus for handling and sorting loads by traversing them from a storage line at one side of a traverser to a line parallel with this storage line on the other side of the traverser and for transferring loads from one position to another position on the same line, in which the traverser includes a main carriage movable along a track parallel with the said lines, an extensible sub-carriage movable transversely of the main carriage and a load supporting carriage for supporting the load to be transferred, said load supporting carriage movable with the sub-carriage to effect the transfer, the main carriage, the sub-carriage and the load supporting carriage constituting a telescopic unit of which the sub-carriage and load supporting carriage are moved at relative speeds such that the load supporting carriage is moved transversely of the main carriage from a position beyond one side of the main carriage to a position flush with the other side in a relatively small movement of the sub-carriage within the main carriage, and means for preventing traversing movement of the main carriage when the sub-carriage and the load supporting carriage are extended beyond fixed substantially central positions.

3. Elevating and traversing apparatus as claimed in claim 1 in which the relative movement of the sub-carriage and load supporting carriage is effected by a compound rack and pinion system, said system including elements mounted on the main carriage, on the sub-carriage and on the load supporting carriage.

4. Elevating and traversing mechanism as claimed in claim 1 in which the traversing movement of the main carriage and the transverse movement of the sub-carriage and load supporting carriage are controlled by a system of motor driven hydraulic pumps, the traversing movement of the main carriage being controlled through the medium of a switch dependent for its operation on the position of the load supporting carriage with respect to the main carriage.

5. Elevating and traversing mechanism as claimed in claim 1 in which the traversing movement of the main carriage and the transverse movement of the sub-carriage and load supporting carriage are controlled by a system of motor driven hydraulic pumps, the traversing movement of the main carriage being controlled through the medium of a switch dependent for its operation on the position of the load supporting carriage with respect to the main carriage, and operating a valve controlling the delivery of the pump which effects the traversing movement of the main carriage.

MORRISS JOHNSON BRATLEY.